(12) United States Patent
Vyakaranam et al.

(10) Patent No.: US 8,987,401 B2
(45) Date of Patent: *Mar. 24, 2015

(54) PROCESS FOR MAKING LOW VISCOSITY, FAST CURING SILANE TERMINATED POLYMERS

(75) Inventors: Kamesh R. Vyakaranam, Pearland, TX (US); Ling Zhang, Missouri City, TX (US); Venkat S. Minnikanti, Pearland, TX (US); Rajat Duggal, Pearland, TX (US); William A. Koonce, Pearland, TX (US); Amarnath Singh, Pearland, TX (US); Phillip S. Athey, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/119,072

(22) PCT Filed: Jun. 14, 2012

(86) PCT No.: PCT/US2012/042444

§ 371 (c)(1),
(2), (4) Date: Nov. 20, 2013

(87) PCT Pub. No.: WO2013/003061

PCT Pub. Date: Jan. 3, 2013

(65) Prior Publication Data

US 2014/0100348 A1    Apr. 10, 2014

Related U.S. Application Data

(60) Provisional application No. 61/503,549, filed on Jun. 30, 2011.

(51) Int. Cl.
| | | |
|---|---|---|
| C08G 77/06 | (2006.01) | |
| C08G 18/10 | (2006.01) | |
| C08G 18/28 | (2006.01) | |
| C08G 18/71 | (2006.01) | |
| C08G 18/76 | (2006.01) | |

(52) U.S. Cl.
CPC ............. *C08G 18/10* (2013.01); *C08G 18/289* (2013.01); *C08G 18/718* (2013.01); *C08G 18/7621* (2013.01); *C08G 2190/00* (2013.01)
USPC .................. 528/15; 528/29; 528/21; 528/31; 528/17

(58) Field of Classification Search
USPC .................................... 528/15, 21, 31, 29, 17
See application file for complete search history.

(56) References Cited

U.S. PATENT DOCUMENTS

| | | |
|---|---|---|
| 3,408,321 A | 10/1968 | Ashby et al. |
| 4,374,237 A | 2/1983 | Berger et al. |
| 4,448,939 A | 5/1984 | Fasolka et al. |
| 5,068,304 A | 11/1991 | Higuchi et al. |
| 5,227,434 A | 7/1993 | Katz |
| 5,539,045 A | 7/1996 | Potts et al. |
| 5,990,257 A | 11/1999 | Johnston et al. |
| 8,084,566 B2 | 12/2011 | Rautschek et al. |
| 2002/0013427 A1 | 1/2002 | Tsuji et al. |
| 2003/0092867 A1 | 5/2003 | Sato et al. |
| 2005/0075469 A1 | 4/2005 | Feng |
| 2005/0215701 A1 | 9/2005 | Porsch et al. |
| 2006/0004173 A1 | 1/2006 | Mager |
| 2006/0205911 A1 | 9/2006 | Ludewig et al. |
| 2007/0060714 A1 | 3/2007 | Yang et al. |
| 2007/0100108 A1 | 5/2007 | Huang et al. |
| 2007/0232751 A1 | 10/2007 | Ludewig et al. |
| 2008/0076899 A1 | 3/2008 | O'Keefe et al. |
| 2009/0137750 A1 | 5/2009 | Ludewig et al. |
| 2013/0060000 A1 | 3/2013 | Zhang et al. |

FOREIGN PATENT DOCUMENTS

| | | |
|---|---|---|
| EP | 676403 A1 | 10/1995 |
| EP | 0732348 A1 | 9/1996 |
| EP | 1146062 A1 | 10/2001 |
| EP | 1721948 A2 | 11/2006 |

(Continued)

OTHER PUBLICATIONS

English language translation (machine generated) JP 05-125175, May 1993.*
International Search Report and Written Opinion for PCT/US2012/042444, mail date Oct. 10, 2012, 12 pages.
International Preliminary Report on Patentability for PCT/US2012/042444, issuance date Jan. 7, 2014, 9 pages.

*Primary Examiner* — Margaret Moore

(57) ABSTRACT

Methods of producing a composition comprising a crosslinkable silane-terminated polymer having at least one crosslinkable silyl group in each molecule are provided. The method may comprise providing a polymer having at least one unsaturated group and at least one alcohol hydroxyl group in each molecule and having a number average molecular weight between about 100 and about 5,000, adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency greater than 50% as determined by $^1$H-NMR, capping the hydrosilylated polymers by adding the hydrosilylated polymer to at least one isocyanate at an index of between about 100 and about 250, and reacting the isocyanate capped hydrosilylated polymer with a polyol having a nominal functionality of at least 2 to form the composition comprising a crosslinkable silane-terminated polymer.

17 Claims, No Drawings

(56) References Cited

FOREIGN PATENT DOCUMENTS

| | | | |
|---|---|---|---|
| EP | 2050772 | A1 | 4/2009 |
| WO | 2005/042609 | A1 | 5/2005 |
| WO | 2008/027499 | A2 | 3/2008 |
| WO | 2011/150161 | A2 | 12/2011 |
| WO | 2012003187 | A1 | 1/2012 |
| WO | 2012003216 | A1 | 1/2012 |

* cited by examiner

PROCESS FOR MAKING LOW VISCOSITY, FAST CURING SILANE TERMINATED POLYMERS

BACKGROUND OF THE INVENTION

1. Field of the Invention

Embodiments of the invention relate to silane-terminated polymers and methods for producing the same.

2. Description of the Related Art

Crosslinkable silane-terminated polymers (STPs) are widely used as raw material polymers in coating materials, adhesives, sealing materials, elastomers and the like (CASE applications) for architectural or industrial use. Commercially available STPs are typically made via three routes: (1) hydrosilylation of vinyl terminated polyether containing alkoxysilane end groups and polyether backbones; (2) aminosilane chemistry, where an isocyanate-terminated prepolymer is reacted to an aminosilane with a resulting product containing urea bonds as well as alkoxysilyl end groups and polyether backbones; and (3) SPUR technology, where an isocyanatosilane is reacted to a hydroxyl-terminated prepolymer with a resulting product containing urethane linkages as well as alkoxysilyl end groups and polyether backbones. The latter two technologies, especially the aminosilane technology, typically suffer from high viscosity in products due to the presence of urethane and/or urea bonds. From a formulation point of view, high viscosity STP resins are undesirable and require large amounts of diluent during formulation.

In industrial applications, product consistency and properties are of great importance. Impurities commonly seen in raw materials are known to impact such qualities desired by resin manufacturer.

Therefore there is a need for low viscosity and fast curing crosslinkable silane-terminated polymers

SUMMARY OF THE INVENTION

Embodiments of the invention relate to methods for producing silane-terminated polymers. In one embodiment, a method of producing a composition comprising a crosslinkable silane-terminated polymer having at least one crosslinkable silyl group in each molecule is provided. The method comprises providing a polymer having at least one unsaturated group and at least one alcohol hydroxyl group in each molecule and having a number average molecular weight between about 100 and about 5,000, adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency greater than 50% as determined by $^1$H-NMR, capping the hydrosilylated polymers by adding the hydrosilylated polymer to at least one isocyanate at an index of between about 100 and about 250, and reacting the isocyanate capped hydrosilylated polymer with a polyol having a nominal functionality of at least 2 to form the composition comprising a crosslinkable silane-terminated polymer.

In another embodiment, a method of producing a composition comprising a crosslinkable silane-terminated polymer having at least one crosslinkable silyl group in each molecule is provided. The method comprises providing a polymer having at least one unsaturated group and at least one alcohol hydroxyl group in each molecule, having a number average molecular weight between about 100 and about 5,000, and a basicity between 0 and $1.9 \times 10^{-3}$ mgKOH/g, adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency greater than 50% as determined by $^1$H-NMR, capping the hydrosilylated polymer by exposing the hydrosilylated polymer to at least one isocyanate at an index of between about 100 and about 250, and reacting the isocyanate capped hydrosilylated polymer with a polyol having a nominal functionality of at least 2 to form the composition comprising a crosslinkable silane-terminated polymer.

DETAILED DESCRIPTION

Embodiments of the invention relate to silane-terminated polymers and methods for producing the same. The methods described herein produce low viscosity, fast curing, silane terminated polymer resins. In certain embodiments, the process comprises (1) a hydrosilylation reaction of a vinyl-terminated monol with an alkoxysilane in the presence of a catalyst to produce an alkoxysilyl terminated monol, (2) a capping reaction of the alkoxysilyl terminated monol with an isocyanate, such as TDI (toluene diisocyanate), and (3) a coupling reaction obtained by reacting the isocyanate capped prepolymer with a polyol to produce the STP. The capping reaction is performed in a sequence of adding the alkoxysilyl monol to the isocyanate at a first temperature (e.g., 60° C.) and a certain rate without the addition of a catalyst. The capping reaction reaches completion at 85° C. producing an isocyanate capped prepolymer of 2.69 to 3.18% NCO. In certain embodiments, the vinyl-terminated monol has a basicity from 0 to $4.7 \times 10^{-3}$ mgKOH/g, preferably from 0 to $1.9 \times 10^{-3}$ mgKOH/g, more preferably from 0 to $1.4 \times 10^{-3}$ mgKOH/g, and most preferably from 0 to $1.0 \times 10^{-3}$ mgKOH/g. In certain embodiments, di-functional STPs produced using the aforementioned process have a viscosity between 9-16 Pa·s, a skin time of 11±3, and a cure time of 25±3 hrs. In certain embodiments, tri-functional STPs produced using the aforementioned process have a viscosity between 9-16 Pa·s, a skin time of 8±2, and a cure time of 16±3.

The polyol may be modified to achieve a desired basicity range. For example, in embodiments where the vinyl-terminated monol is too basic, the vinyl-terminated monol may be treated with an acid to achieve the desired basicity range. In embodiments where the vinyl-terminated monol is too acidic, the vinyl-terminated monol may be treated with a base to achieve the desired basicity range.

As used herein, the term "hydrosilylation efficiency"= [100×((number of unsaturation groups on the polyol hydrosilylated)/(total number of unsaturation groups on the polyol that were initially available for hydrosilylation))], and may be measured using $^1$H-NMR or IR spectroscopy.

In certain embodiments described herein, the silane terminated polymer may be obtained by the hydrosilylation of a polymer having at least one unsaturated group, and at least one alcohol hydroxyl group in each molecule. The polymer having at least one unsaturated group and at least one alcohol hydroxyl group in each molecule may have a basicity between 0 and 1.9×10-3 mgKOH/g. The hydrosilylated polymers may then be capped by adding the hydrosilylated polymer to at least one isocyanate to form a composition including isocyanate capped hydrosilylated polymers. The isocyanate capped hydrosilylated polymers may have an NCO % between 2.69-3.18%. The isocyanate capped hydrosilylated polymers may then be reacted with a polyol to form the STP.

Hydrosilylation:

The polymer having at least one unsaturated group and at least one alcohol hydroxyl group is not particularly restricted, and may include any polymer as long as they include at least one unsaturated group (such as a carbon-carbon double bond or carbon-carbon triple bond), and at least one alcohol hydroxyl group. The polymer having at least one unsaturated group and at least one alcohol hydroxyl group may have a basicity from 0 to $4.7 \times 10^{-3}$ mgKOH/g, preferably from 0 to $1.9 \times 10^{-3}$ mgKOH/g, more preferably from 0 to $1.4 \times 10^{-3}$ mgKOH/g, and most preferably from 0 to $1.0 \times 10^{-3}$ mgKOH/g.

The polymer having at least one unsaturated group and at least one alcohol hydroxyl group may have a molecular weight of 44 gram/mol or greater, preferably greater than 58 gram/mol, and more preferably greater than 100 gram/mol.

The polymer having at least one unsaturated group and at least one alcohol hydroxyl group in each molecule may have a number average molecular weight of between about 100 and about 5,000. All individual values and sub-ranges from 100 to 5,000 are included herein and disclosed herein; for example, the number average molecular weight can be from a lower limit of 100, 200, 300, 400, 500, 600, 700, 800, 900, 1,000, 1,250, 1,500, or 1,750 to, independently, an upper limit of 1,000, 1,250, 1,500, 1,750, 2,000, 2,500, 3,000, 3,500, 4,000, 4,500, or 5,000.

In one embodiment, the polymer having at least one unsaturated group and at least one alcohol hydroxyl group in each molecule may be a polyoxyalkylene polymer as described in co-pending PCT Patent Application No. PCT/US11/038065, entitled "Methods for Producing Crosslinkable Silyl Group-Containing Polyoxyalkylene Polymers," which is hereby incorporated by reference in its entirety.

In one embodiment, the polymer having at least one unsaturated group and at least one alcohol hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcohol hydroxyl, phenolic hydroxyl or carboxyl group.

The polymer having at least one unsaturated group and at least one alcohol hydroxyl group may include allyl alcohol, methallyl alcohol, trimethylolpropane monoallyl ether, trimethylolpropane diallyl ether, glycerol monoallyl ether, glycerol diallyl ether, ethylene oxide adducts or propylene oxide adducts thereof and like compounds containing at least one unsaturated group and at least one alcohol hydroxyl group in each molecule, hydroxyl-terminated hydrocarbon compounds such as hydroxyl-terminated polybutadiene, and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcohol hydroxyl group in each molecule may be a propylene glycol monoallyl ether having a number average molecular weight between about 600 and about 1,000, and an OH number of between about 50 and about 90.

The polymer having at least one unsaturated group and at least one alcohol hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

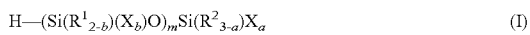

$$H—(Si(R^1_{2-b})(X_b)O)_m Si(R^2_{3-a})X_a \quad (I)$$

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of —$SiR^1_{2-b})(X_b)O$— groups may be the same or different with each other or one another; and m represents an integer from 0 to 19 provided that the relation $a+\Sigma b \geq 1$ should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum $(a+\Sigma b)$ is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (II) may include the compounds represented by the general formula (II):

$$H—Si(R^4_{3-c})(X_c) \quad (II)$$

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis(methyl ethyl ketoximato)methylsilane and tris(acetoximato) silane; alkenyloxysilanes such as methyl isopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6.6H_2O$, platinum-divinylsiloxane complexes, platinum-olefin complexes, Pt metal, RhCl $(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$ and the like are preferred, $H_2PtCl_6.6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3, 3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcohol hydroxyl group in each molecule. When the amount is less than 0.00001 parts by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or between the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcohol hydroxyl group in each molecule are hydrosilylated with a hydrosilylation efficiency of at least about 50%, preferably at least about 75% and more preferably at least about 80%. All individual values and subranges from about 50 to about 100 are included herein and disclosed herein; for example, the hydrosilylation efficiency can be from a lower limit of about 50, 55, 60, 65, 70, 75, 80, 90, or 92%, to, independently, an upper limit of about 55, 60, 65, 70, 75, 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be capped with a polyisocyanate compound.

Capping:

The hydrosilylated polymers may then be capped by adding the hydrosilylated polymer to at least one isocyanate to form a composition including isocyanate capped hydrosilylated polymers. The isocyanate capped hydrosilylated polymers may have an NCO % between 2.69-3.18%. The isocyanate capped hydrosilylated polymers may have an NCO/OH ratio of between 1.0 and 2.5, preferrably between 1.2 and 2.2, and most preferrably between 1.6 and 2.0. The capping reaction may be performed without the addition of catalysts during the capping reaction.

The NCO-capping reaction may be performed by adding a first amount of hydrosilylated polymer to at least one isocyanate at a first temperature to form a reaction mixture. The first temperature may be from a lower limit of 20° C., 25° C., 30° C., 35° C., 40° C., 45° C., 50° C., 55° C., 60° C., 65° C., 70° C., 75° C., 80° C., 85° C., 90° C., or 95° C. to an upper limit of 25° C., 30° C., 35° C., 40° C., 45° C., 50° C., 55° C., 60° C., 65° C., 70° C., 75° C., 80° C., 85° C., 90° C., 95° C., or 100° C. The first temperature may be from about 50° C. to about 70° C., for example, about 60° C. An additional amount of hydrosilylated polymer may be added to the reaction mixture for a time period. The time period may be between 35 to 40 minutes. In certain embodiments, the reaction mixture is then heated to a second temperature. The second temperature may be from about a lower limit of 70° C., 75° C., 80° C., 85° C., 90° C., and 95° C. to an upper limit of 75° C., 80° C., 85° C., 90° C., and 100° C., for example, about 85° C. The NCO-capping reaction may occur for a time period. The time period may be between 6 hours and 14 hours, for example (e.g., 8 hours). FTIR spectra and % NCO titration samples may be collected both before and after the reaction to confirm a NCO number of between 2.69 and 3.18%.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

Suitable TDI products are available from the Dow Chemical Company under the trade name VORANATE®. Suitable commercially available products of that type include VORANATE® T-80 which is also available from The Dow Chemical Company. Suitable MDI products are available from The Dow Chemical Company under the trade names PAPI®, VORANATE® and ISONATE®.

The isocyanate may have a functionality of at least greater than one, preferably greater than 1.2, and more preferably greater than 1.8.

The capping reaction may be performed at an isocyanate index of between about 100 and about 250. All individual values and sub-ranges from 100 to 250 are included herein and disclosed herein; for example, the isocyanate index can be from a lower limit of 100, 105, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180.

Additional catalysts are typically not added during the capping reaction. It has been found that performing the capping reaction without additional catalysts leads to a reduction of undesirable by-products (e.g., allophanates and isocyanurates) in the capped material. Although it is preferable to perform the capping reaction without an additional catalyst, in certain embodiments, a minor amount of catalyst may be used (e.g., 10 to 50 ppm) to increase the reaction rate. In certain embodiments where additional catalysts are added during the capping reaction the basicity of the initial monol may be adjusted to reduce the formation of undesirable by-products. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Coupling

The isocyanate capped polymers may be coupled with a polyol having a nominal functionality of 2 to form the final silane-terminated polymers. Any suitable polyol may be used. Exemplary polyols include polyether polyols, polycarbonate polyols, polyester polyols, polycarbonate-polyester polyols, polyether-polyester polyols, polyether-polycarbonate polyols, and copolymer-filled polyols (CPPs).

Exemplary Polyether polyols may be prepared by adding an alkylene oxide, such as ethylene oxide, propylene oxide, butylene oxide or a combination thereof, to an initiator having from 2 to 8, preferably 2 to 4 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The initiator may be selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis (hydroxymethyl)tricyclo[5,2,1,02,6]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In one embodiment, the initiator is a mixture of 1,3-cyclohexanedimethanol and 1,4-cyclohexanedimethanol and is commercially available under the trade name UNOXOL from The Dow Chemical Company which is an approximate 1:1 mixture of (cis, trans) 1,3-cyclohexanedimethanol and (cis, trans) 1,4-cyclohexanedimethanol. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1, 2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

Exemplary polyether polyols are available under the tradename ACCLAIM® polyol from Bayer MaterialSciences and VORANOL™ polyol. Suitable commercially available products of that type include ACCLAIM® 6300 Polyol, ACCLAIM® 8200 Polyol, VORANOL P 2000 polyol, VORANOL P 4000, and VORANOL 8000LM.

Exemplary Polycarbonate polyols may be prepared by reacting at least one polyol mixture comprising (i) one or more alkane diols (ii) with at least one organic carbonate. The one or more polycarbonate polyols may be obtained by subjecting the at least one polyol mixture and the at least one carbonate compound to a polymerization reaction. With respect to the method for performing the polymerization reaction, there is no particular limitation, and the polymerization reaction can be performed by using conventional methods known in the art.

The one or more alkane diols (i) may be selected from the group comprising: aliphatic diols having 2 to 50 carbon atoms in the chain (branched or unbranched) which may also be interrupted by additional heteroatoms such as oxygen (O), sulphur (S) or nitrogen (N). Examples of suitable diols are 1,3-propanediol, 1,4-butanediol, 1,5-pentanediol, 1,6-hexandiol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl) ether or short-chain $C_2$, $C_3$ or $C_4$ polyether diols having a number average molecular weight of less than 700 g/mol, combinations thereof, and isomers thereof.

The at least one carbonate compound (ii) may be selected from alkylene carbonates, diaryl carbonates, dialkyl carbonates, dioxolanones, hexanediol bis-chlorocarbonates, phosgene and urea. Examples of suitable alkylene carbonates may include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Examples of suitable dialkyl carbonates may include dimethyl carbonate, diethyl carbonate, di-n-butyl carbonate, and the like and the diaryl carbonates may include diphenyl carbonate.

The polymerization reaction for the polycarbonate polyol may be aided by a catalyst. With respect to the method for performing the polymerization reaction, there is no particular limitation, and the polymerization reaction can be performed by using conventional methods known in the art. The polymerization reaction may be a transesterification reaction. In a transesterification reaction, one preferably contacts reactants in the presence of a transesterification catalyst and under reaction conditions. In principle, all soluble catalysts which are known for transesterification reactions may be used as catalysts (homogeneous catalysis), and heterogeneous transesterification catalysts can also be used. The process according to the invention is preferably conducted in the presence of a catalyst.

Exemplary polycarbonate polyols comprising repeating units from one or more alkane diol components are available from Arch Chemicals, Inc., under the trade name Poly-CD™220 carbonate diol, from Bayer MaterialScience, LLC, under the tradename DESMOPHEN® polyols, and Asahi polyols available from Asahi Glass Company, Ltd.

Exemplary Polyester polyols may be the reaction product of (i) one or more organic acids and (ii) one or more alcohols having an OH functionality of two or more.

The one of more organic acids (i) may be a multifunctional organic acid. The one or more organic acids (i) may include at least one of aliphatic acids and aromatic acids. The one or more organic acids (i) may be selected from the group comprising for example, phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids (linolic, oleic and the like) and combinations thereof. Anhydrides of the above acids, where they exist, can also be employed. In addition, certain materials which react in a manner similar to acids to form polyester polyol oligomers are also useful. Such materials include lactones such as caprolactone, and methcaprolactone, and hydroxy acids such as tartaric acid and dimethylolpropionic acid. If a triol or higher hydric alcohol is used, a monocarboxylic acid, such as acetic acid, may be used in the preparation of the polyester polyol oligomer, and for some purposes, such as polyester polyol oligomer may be desirable. Preferably, the one or more organic acids is adipic acid.

The one or more alcohols (ii) having an OH functionality of 2 or more (ii) may be selected from the group comprising, for example, ethylene glycol, propylene glycol, 1,2-butylene glycol, 2,3-butylene glycol, 1,3-propanediol, 1,3-butanediol, 1,4-butanediol, 1,6-hexanediol, neopentylglycol, 1,2-ethylhexyldiol, 1,5-pentanediol, 1,10-decanediol, 1,3-cyclohexanedimethanol, 1,4-cyclohexanedimethanol (CHDM), glycerine, trimethylolpropane, hexanetriol-(1,2,6) butane triol-(1,2,4), trimethylolethane, pentaerythritol, quinitol, mannitol and sorbitol, methylglycoside, also diethylene glycol, triethylene glycol, tetrathylene glycol, polyethylene glycols, dibutylene glycol, polybutylene glycols, and combinations thereof.

In certain embodiments where the polyester polyol (a) is hydrophobic, the polyester polyol (a) may further comprise the reaction product of (iii) at least one hydrophobic monomer. The at least one hydrophobic monomer (iii) may include at least one of one or more dimer acids, dimer diols, hydroxy stearic acid, one or more hydroxymethylated fatty acids or esters thereof, or combinations thereof.

The polyester polyol may be formed by a polymerization reaction. With respect to the method for performing the polymerization reaction, there is no particular limitation, and the polymerization reaction can be performed by using conventional methods known in the art. The polymerization reaction may be aided by a catalyst. Examples of the catalyst may include metals such as lithium, sodium, potassium, rubidium, cesium, magnesium, calcium, strontium, barium, titanium, zirconium, hafnium, cobalt, zinc, aluminum, germanium, tin, lead, antimony, arsenic, and cerium and compounds thereof. As the metallic compounds, oxides, hydroxides, salts, alkoxides, organic compounds, and the like may be mentioned. Of these catalysts, it is preferred to use titanium compounds such as titanium tetrabutoxide, titanium tetra-n-propoxide, titanium tetra-isopropoxide, titanium 2-ethyl hexanoate, and titanium acetylacetonate tin compounds such as di-n-butyltin dilaurate, di-n-butyltin oxide, and dibutyltin diacetate, lead compounds such as lead acetate and lead stearate. Exemplary titanium catalysts are available from DUPONT™ under the tradename TYZOR® titanium acetylacetonates. Suitable commercially available products of that type include TYZOR® AA-105.

Exemplary polycarbonate-polyester copolymer polyols may be the reaction product of (a) a polyester polyol and (b) one or more polycarbonate polyols. The polymerization reaction may be a transesterification reaction. In principle, all soluble catalysts which are known for transesterification reactions may be used as catalysts (homogeneous catalysis), and heterogeneous transesterification catalysts can also be used. The exemplary catalysts described above for formation of the polycarbonate polyol may also be used for formation of the polycarbonate-polyester polyol.

For increasing the rate of reaction or improving the degree of conversion a catalyst may be used. The catalyst may be a tin free catalyst, such as zinc octoate, metatin catalyst (Dimethyltin dineodecanoate), 1,8 diaza-bicyclo (5,4,0) undecene-7 (DBU), acid blocked DBU, such as for example acrylic acid blocked DBU, titanium catalysts such as organometallic titanium catalysts, or combinations thereof.

The coupling reaction temperature is not particularly restricted but may be within the range of 0° C. to 150° C., or between the range of 20° C. to 100° C. At below 0° C., the rate of reaction may be low in some instances and, at above 150° C. In one embodiment, the hydrosilylation reaction temperature is about 70° C.

In certain embodiments, tri-functional STPs produced using the aforementioned process have a viscosity between 9-16 Pa·s, a skin time of 6 to 10 hours, and a cure time of 13 to 19 hours. In certain embodiments, di-functional STPs produced using the aforementioned process have a viscosity between 9-16 Pa·s, a skin time of 11±3 hours, and a cure time of 25±3 hours. In certain embodiments, tri-functional STPs produced using the aforementioned process have a viscosity between 9-16 Pa·s, a skin time of 8±2 hours, and a cure time of 16±3 hours.

According to the embodiments of the invention, the resulting silane-terminated polymers may be useful, among other things, to be reacted with one another to further lengthen the molecular chains for uses such as sealants, adhesives, and coatings, and combinations thereof. When silyl polymers are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of the embodiments of the invention are bonded to form an infusible elastomeric material. To avoid premature curing, the compositions of the embodiments of the invention may be stored and maintained in the absence of moisture until cure is desired. Then, when cure is desired, the polymer may be exposed to atmospheric or other moisture.

Furthermore, the reaction of curing of the silyl polymer may be facilitated by use of a silanol condensation catalyst or curing accelerator. Silanol condensation catalysts or accelerators are well known in the art such as those disclosed in U.S. Pat. No. 6,355,127 and include the following: titanic acid esters, such as tetrabutyl titanate, tetrapropyl titanate, and the like; organotin compounds, such as dibutyltin dilaurate, metatin catalyst (Dimethyltin dineodecanoate), dibutyltin maleate, dibutyltin diacetate, tin octylate, tin naphthenate, reaction products of dibutyltin oxide and phthalic acid esters, dialkyltin diacetyl acetonates, such as dibutyltin bis(acetylacetonate); dialkyltinoxides, such as dibutyltinoxide, organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonoate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. These compounds are not limited; one can use any silanol condensation catalyst which is in general use. These silanol condensation catalysts may be used individually or in combinations. Such catalysts and accelerators include tetrabutyltitanate, dibutyltin dilaurate, dibutyltin bis(acetylacetonate), and the like. The catalyst may be present in an amount of about at least about 0.1 percent by weight of the polymer, at least about 0.5 percent by weight of the polymer, at least about 1 percent by weight of the polymer, at least about 1.5 percent by weight of the polymer, or at least about 2 percent by weight of the polymer and at most about 8 percent by weight of the polymer, at most about 6 percent by weight of the polymer, at most about 5 percent by weight of the polymer, at most about 4 percent by weight of the polymer, or at most about 3.5 percent based on weight of the polymer. Such catalysts may be combined with the polymer by means within the skill in the art during the formulation of the sealant, coating, or adhesive.

The resulting cured silyl polymers are also embodiments of the invention. Similarly, the embodiments of the invention include the sealants, adhesives, and coatings and other end uses comprising these polymers or prepolymers. Preferred properties for the silyl polymers may differ somewhat for each end use as do other components that are optionally present in compositions suitable for each.

Test Methods:

Tensile strength was measured according to ASTM standard test D1708. Elongation at break was measured according to ASTM standard test D1708. 100% Secant Modulus was measured according to ASTM standard test D1708. The number average molecular weight was determined by gel permeation chromatography using PEG standards, according to ASTM standard test D5296. Viscosity was measured using a rheometer AR2000 by TA Instruments. Approximately 1 mL of sample was dispensed into a 60 mm diameter 60-degree cone and plate geometry. After removal of any excess material, the viscosity test was performed by heating the sample from 20° C. to 100° C. at 3° C./min. Shear rate of the test was kept constant at 0.1 s$^{-1}$.

EXAMPLES

Objects and advantages of the embodiments described herein are further illustrated by the following examples. The particular materials and amounts thereof, as well as other conditions and details, recited in these examples should not be used to limit the embodiments described herein.

A description of the raw materials used in the examples is as follows:

ACCLAIM® 6300 Polyol A triol based on propylene oxide with a molecular weight of about 6,000 and a hydroxyl number between 26.5 and 29.5 mg KOH/g, available from Bayer MaterialScience.

ACCLAIM® 8200 Polyol A diol based on propylene oxide with a molecular weight of about 8,000 and a hydroxyl number between 13.0 and 15.0 mg KOH/g, available from Bayer Material Science.

Allyl Monol A propylene glycol monoallyl ether having an allylic content of 3.5 wt % (0.998 mol of unsat/mol monol), a number average molecular weight of about 800, and an OH number of 70 or 2.1 wt % OH, available from The Dow Chemical Company under the tradename UCON™ Hydrolube APPG 800.

DABCO T-12 A dibutyltin dilaurate catalyst (DBTL) available from Air Products.

DBTA Dibutyltin bis(acetylacetonate), Available from SIGMA-ALD RICH®.

DDBSA Dodecyl benzene sulfonic acid. Available from SIGMA-ALD RICH®.

Karstedt's catalyst Platinum-divinyltetramethyldisiloxane and xylene as carrier solvent, the Pt loading in the catalyst is 2 wt %, available from Gelest, Inc.

Methyldimethoxysilane Available from Gelest, Inc.

POLYCAT 41 A trimerization catalyst available from Air Products.

SnAcAc Tin (II) Acetylacetonate, available from Sigma Aldrich.

TOYOCAT-DB30 Acid blocked tertiary amine (1,8-Diazabicyclo[5.4.0]undec-7-ene) catalyst available from Tosoh Corporation.

VORANATE® T-80 A toluene diisocyanate (80% 2,4-toluene diisocyanate and 20% 2,6-toluene diisocyanate by weight) composition, available from The Dow Chemical Company.

Zn Octoate Available from Shepherd Chemical Corporation.

Example 1

Synthesis of STP Sample 1

Hydrosilylation reaction was performed by charging UCON™ APPG-800R (24.9 kg) having an allylic content of 3.5 wt %, a hydroxyl number of 70 or 2.1 wt % OH, and a basicity of 0.92×10-3 mgKOH/g, into a 10-gallon pre-dried stainless steel reactor equipped with a mechanical agitator. Karstedt's catalyst (approximately 2.7 g) was then added to the reactor and mixed for 2-minutes under a continuous nitrogen purge. Methyldimethoxysilane (3.35 kg) was added last and mixed for 5 minutes before the entire reactor was heated to 60° C. for 2 hours. The hydrosilylation product (hereinafter referred to as Component A) was analyzed using $^1$H-NMR and results showed a hydrosilylation efficiency of >99%, with EW of 997 (measured value of OH#) and GPC (Mn~1024).

A NCO-capping reaction was carried out by transferring Component A (4.98 kg) to a steel reactor equipped with a mechanical stirrer and padded with nitrogen. A continuous nitrogen purge started as VORANATE® T-80, 80/20 mixture of 2,4- and 2,6-toluene diisocyanate (4.08 kg), was added to the reactor (isocyanate index=171) and the reaction temperature set at 60° C. Additional Component A (19.6 kg) was added to the reactor over a time period of 35-40 min, after which the reaction temperature was increased to 85° C. NCO-capping reaction was allowed to occur over 14 hours. The NCO-capped intermediate (hereinafter referred to as Component B) was analyzed and FTIR spectra and % NCO titration samples were collected both before and after the reaction to confirm a NCO number of 3.18%.

Coupling reaction/product formation step was performed by reacting Component B (4.98 kg) with Acclaim® 8200 (15.4 kg) in the presence of DABCO® T-12 (9.07 g) for 2 hours at 70° C. under nitrogen purge. The resulting product was characterized via gel permeation chromatography which gave 4 distinctive peaks indicating an average number molecular weight of 20448 (18.3%), 10484 (68.6%), 2559 (10.4%) and 1084 (3.04%) g/mol.

Film formation was performed by adding dibutyltin Bis-(acetylacetoate) (0.05 g) to Sample 1 (10 g) and a 25 mil thick film was casted and allowed to cure at room temperature, at 50% relative humidity for 7 days. Cured Sample 1 has a tensile strength of 36±4 psi, a % elongation at break 312±30%, a stress at 100% of 13±2 psi.

Example 2

Synthesis of STP Sample 2

Component B (7.85 kg) was reacted with Acclaim® 6300 (12.32 kg) in the presence of DABCO® T-12 (4.3 g) for 2 hours at 70° C. under a continuous nitrogen purge. The resulting product was characterized via gel permeation chromatography which gave 4 distinctive peaks indicating an average number molecular weight of 23016 (24.8%), 7883 (54.9%), 2575 (14.2%) and 1031 (1.3%) g/mol.

Film formation was performed by adding dibutyltin Bis-(acetylacetoate) (0.5 g) to Sample 2 (100 g) and a 25 mil thick film was casted and allowed to cure at room temperature, at 50% relative humidity for 7 days. Cured Sample 2 has a tensile strength of 97±12 psi, a % elongation at break 127±21%, a stress at 100% of 78±2 psi.

Results:

TABLE I

Table 1. Viscosities of Samples 1 and 2.

| Level | Number | Mean | Lower 95% | Upper 95% |
|---|---|---|---|---|
| 602 15L Run 1 | 6 | 13.7 | 13.2 | 14.3 |
| 602 15L Run 3 | 6 | 12.5 | 12.4 | 12.7 |
| 602 15L Run 5 | 6 | 12.0 | 11.8 | 12.2 |
| 603 15L Run 2 | 6 | 9.7 | 9.6 | 9.8 |
| 603 15L Run 4 | 6 | 12.8 | 12.6 | 12.9 |
| XMX602 Run 1 | 7 | 15.2 | 14.9 | 15.4 |
| XMX602 Run 2 | 12 | 14.4 | 14.2 | 14.6 |
| XMX603 Run 1 | 7 | 15.7 | 15.5 | 16.0 |
| XMX603 Run 2 | 4 | 14.6 | 14.5 | 14.7 |

TABLE II

Tensile Strength of Various triol Samples.

| Level | Number | Mean | Lower 95% | Upper 95% |
|---|---|---|---|---|
| 603 15L run (Batch 2) | 5 | 74.9 | 60.8 | 89.0 |
| 603 15L run (Batch 4) | 5 | 98.8 | 81.6 | 116.0 |
| 603 run (B1411 Batch 1) | 4 | 97.3 | 77.8 | 116.8 |
| 603 run (B1411 Batch 2) | 5 | 100.1 | 85.9 | 114.3 |

TABLE III

% Elongation at break of triol samples.

| Level | Number | Mean | Lower 95% | Upper 95% |
|---|---|---|---|---|
| 603 15L run (Batch 2) | 5 | 145.3 | 106.9 | 183.7 |
| 603 15L run (Batch 4) | 5 | 130.6 | 98.3 | 163.0 |
| 603 run (B1411 Batch 1) | 5 | 126.7 | 94.0 | 159.4 |
| 603 run (B1411 Batch 2) | 5 | 152.6 | 123.2 | 182.0 |

TABLE IV

Stress @ 100% (psi) of triol samples.

| Level | Number | Mean | Lower 95% | Upper 95% |
|---|---|---|---|---|
| 603 15L run (Batch 2) | 5 | 56.2 | 54.9 | 57.5 |
| 603 15L run (Batch 4) | 5 | 79.0 | 76.8 | 81.3 |
| 603 run (B1411 Batch 1) | 4 | 79.9 | 77.1 | 82.6 |
| 603 run (B1411 Batch 2) | 5 | 71.8 | 68.6 | 75.0 |

TABLE V

Tensile strength (psi) of diol samples.

| Level | Number | Mean | Lower 95% | Upper 95% |
|---|---|---|---|---|
| 602 15L run (Batch 1) | 5 | 20.9 | 15.3 | 26.4 |
| 602 15L run (Batch 3) | 6 | 31.2 | 24.9 | 37.4 |
| 602 15L run (Batch 5) | 5 | 28.0 | 25.5 | 30.4 |
| 602 run (B1411 Batch 1) | 6 | 35.6 | 31.5 | 39.7 |
| 602 run (B1411 Batch 2) | 7 | 38.5 | 33.2 | 43.8 |

TABLE VI

% Elongation at break (%) of diol samples.

| Level | Number | Mean | Lower 95% | Upper 95% |
|---|---|---|---|---|
| 602 15L run (Batch 1) | 5 | 460.3 | 343.6 | 577.0 |
| 602 15L run (Batch 3) | 6 | 313.0 | 240.7 | 385.4 |
| 602 15L run (Batch 5) | 5 | 458.7 | 431.7 | 485.8 |
| 602 run (B1411 Batch 1) | 6 | 312.4 | 281.0 | 343.8 |
| 602 run (B1411 Batch 2) | 7 | 321.7 | 274.5 | 369.0 |

TABLE VII

Stress @ 100% (psi) of diol samples.

| Level | Number | Mean | Lower 95% | Upper 95% |
|---|---|---|---|---|
| 602 15L run (Batch 1) | 5 | 5.3 | 4.8 | 5.9 |
| 602 15L run (Batch 3) | 6 | 12.9 | 11.7 | 14.1 |
| 602 15L run (Batch 5) | 5 | 7.2 | 5.6 | 8.8 |
| 602 run (B1411 Batch 1) | 6 | 13.5 | 11.4 | 15.5 |
| 602 run (B1411 Batch 2) | 7 | 13.9 | 12.4 | 15.4 |

Low viscosity and fast curing crosslinkable silane-terminated polymers and methods for making the same have been provided.

While the foregoing is directed to embodiments of the invention, other and further embodiments of the invention may be devised without departing from the basic scope thereof.

What is claimed is:

1. A method of producing a composition comprising a crosslinkable silane-terminated polymer having at least one crosslinkable silyl group in each molecule, the method comprising:
    providing a polymer having at least one unsaturated group and at least one alcohol hydroxyl group in each molecule and having a number average molecular weight between about 100 and about 5,000;
    adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency greater than 50% as determined by $^1$H-NMR;
    capping the hydrosilylated polymers by adding the hydrosilylated polymer to at least one isocyanate at an index of between about 100 and about 250; and
    reacting the isocyanate capped hydrosilylated polymer with a polyol having a nominal functionality of at least 2 to form the composition comprising a crosslinkable silane-terminated polymer.

2. The method of claim 1, wherein the adding the hydrosilylated polymer to at least one isocyanate comprises:
    forming a reaction mixture by adding the hydrosilylated polymers to the at least one isocyanate at a first temperature; and
    subsequently heating the reaction mixture to a second temperature.

3. The method of claim 2, wherein the first temperature is from about 20° C. to about 70° C. and the second temperature is from about 70° C. to about 100° C.

4. The method of claim 2, wherein the capping of the hydrosilylated polymers is performed without the addition of a catalyst.

5. The method of claim 1, wherein the polymer having at least one unsaturated group and at least one alcohol hydroxyl group in each molecule has a basicity between 0 and $4.7 \times 10^{-3}$ mgKOH/g.

6. The method of claim 5, wherein the polymer having at least one unsaturated group and at least one alcohol hydroxyl group in each molecule has a basicity between 0 and $1.9 \times 10^{-3}$ mg KOH/g.

7. The method of claim 1, wherein the isocyanate capped hydrosilylated polymers have an NCO number of between 2.69 and 3.18%.

8. The method of claim 7, wherein the hydrosilylation reaction has a hydrosilylation efficiency greater than 80%.

9. The method of claim 1, wherein the polymer having at least one unsaturated group and at least one alcohol hydroxyl group in each molecule comprises a propylene glycol monoallyl ether having a number average molecular weight between about 600 and about 1,000, and an OH number of between about 50 and about 90.

10. The method of claim 9, wherein the isocyanate comprises at least one of 4,4'-, 2,4' and 2,2'-isomers of diphenylmethane diisocyante, 2,4-toluene diisocyanate and 20% 2,6-toluene diisocyanate, aliphatic isocyanate or blends thereof.

11. The method of claim 9, wherein the polyol comprises a polyether polyol.

12. The method of claim 11, wherein the polyol comprises a polyether polyol based on propylene oxide.

13. A method of producing a composition comprising a crosslinkable silane-terminated polymer having at least one crosslinkable silyl group in each molecule, the method comprising:

providing a polymer having at least one unsaturated group and at least one alcohol hydroxyl group in each molecule, having a number average molecular weight between about 100 and about 5,000, and a basicity between 0 and $1.9 \times 10^{-3}$ mgKOH/g;

adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency greater than 50% as determined by $^1$H-NMR;

capping the hydrosilylated polymer by exposing the hydrosilylated polymer to at least one isocyanate at an index of between about 100 and about 250; and reacting the isocyanate capped hydrosilylated polymer with a polyol having a nominal functionality of at least 2 to form the composition comprising a crosslinkable silane-terminated polymer.

14. The method of claim 13, wherein the polymer having at least one unsaturated group and at least one alcohol hydroxyl group in each molecule has a basicity between 0 and 1.4×10-3 mgKOH/g.

15. The method of claim 13, wherein the capping the hydrosilylated polymers is performed without the addition of a catalyst.

16. An article comprising the crosslinkable silane-terminated polymer of claim 1.

17. The article of claim 16 wherein the article is an elastomer, a sealant, an adhesive, a coating or a combination thereof.

* * * * *